United States Patent [19]

Colbert et al.

[11] 4,062,012

[45] Dec. 6, 1977

[54] DIGITAL RADAR SIGNAL PROCESSOR

[75] Inventors: Richard P. Colbert, East Meadow; George Dimitriou, East Northport; Max E. Jones, Northport; Jack I. Haberman, Plainview, all of N.Y.

[73] Assignee: The United States of America as represented by the Secretary of the Navy, Washington, D.C.

[21] Appl. No.: 681,997

[22] Filed: Apr. 30, 1976

Related U.S. Application Data

[63] Continuation-in-part of Ser. No. 487,513, July 11, 1974, abandoned.

[51] Int. Cl.² .............................................. G01S 9/14
[52] U.S. Cl. ................................ 343/7 A; 343/5 DP; 343/7.3; 343/9
[58] Field of Search ........................... 343/7 A, 7.3, 9

[56] References Cited

U.S. PATENT DOCUMENTS

| | | | |
|---|---|---|---|
| 3,460,137 | 8/1969 | Ralston | 343/7 A X |
| 3,487,405 | 12/1969 | Molho et al. | 343/7 A |
| 3,500,396 | 3/1970 | Lampert et al. | 343/7 A |
| 3,699,573 | 10/1972 | Andrews et al. | 343/7 A X |
| 3,701,149 | 10/1972 | Patton et al. | 343/7 A X |
| 3,713,149 | 1/1973 | Bruner et al. | 343/7 A |
| 3,761,922 | 9/1973 | Evans | 343/7 A X |
| 3,768,097 | 10/1973 | Ziegler | 343/9 |
| 3,995,270 | 11/1976 | Perry et al. | 343/7 A |

Primary Examiner—T.H. Tubbesing
Attorney, Agent, or Firm—R. S. Sciascia; A. L. Branning

[57] ABSTRACT

A radar signal processor employs digital circuits to provide two adaptive thresholds which act to reject clutter and noise. A digital constant false alarm unit serves to set the first threshold level by comparing an expected false alarm number with a number of noise pulses occurring in a noise gate generated during the radar dead time. The second threshold is set by establishing a background average. The existence of a target in a particular range cell in relation to the second threshold is determined by comparing its hit count with the hit counts of two range cells proximately following it and the two range cells proximately preceding it. A target is automatically acquired in range and velocity by using a memory unit and constructing a velocity-range matrix which identifies range and velocity by pattern recognition techniques.

9 Claims, 12 Drawing Figures

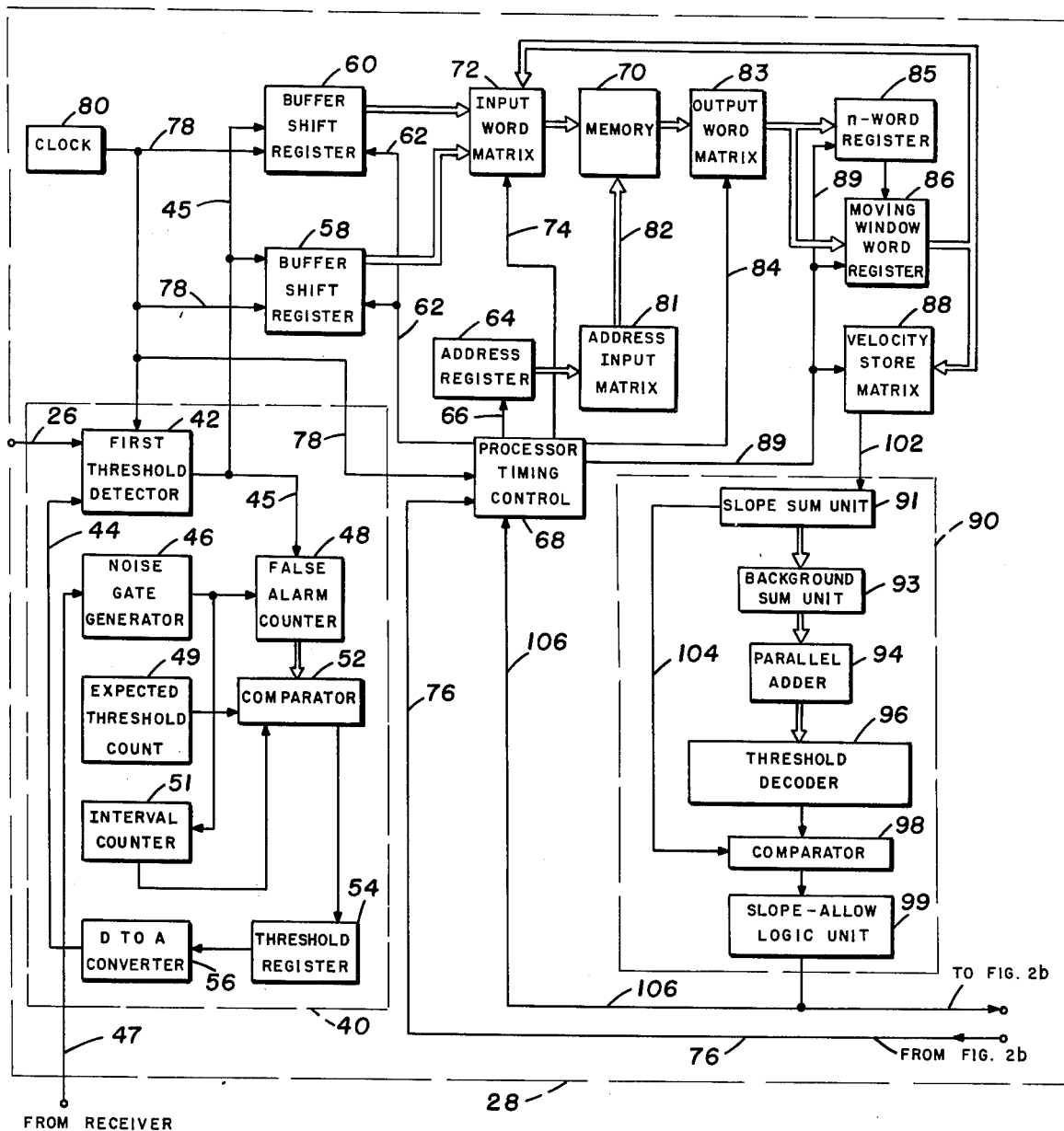
FIG. 2a ACQUISITION PROCESSOR

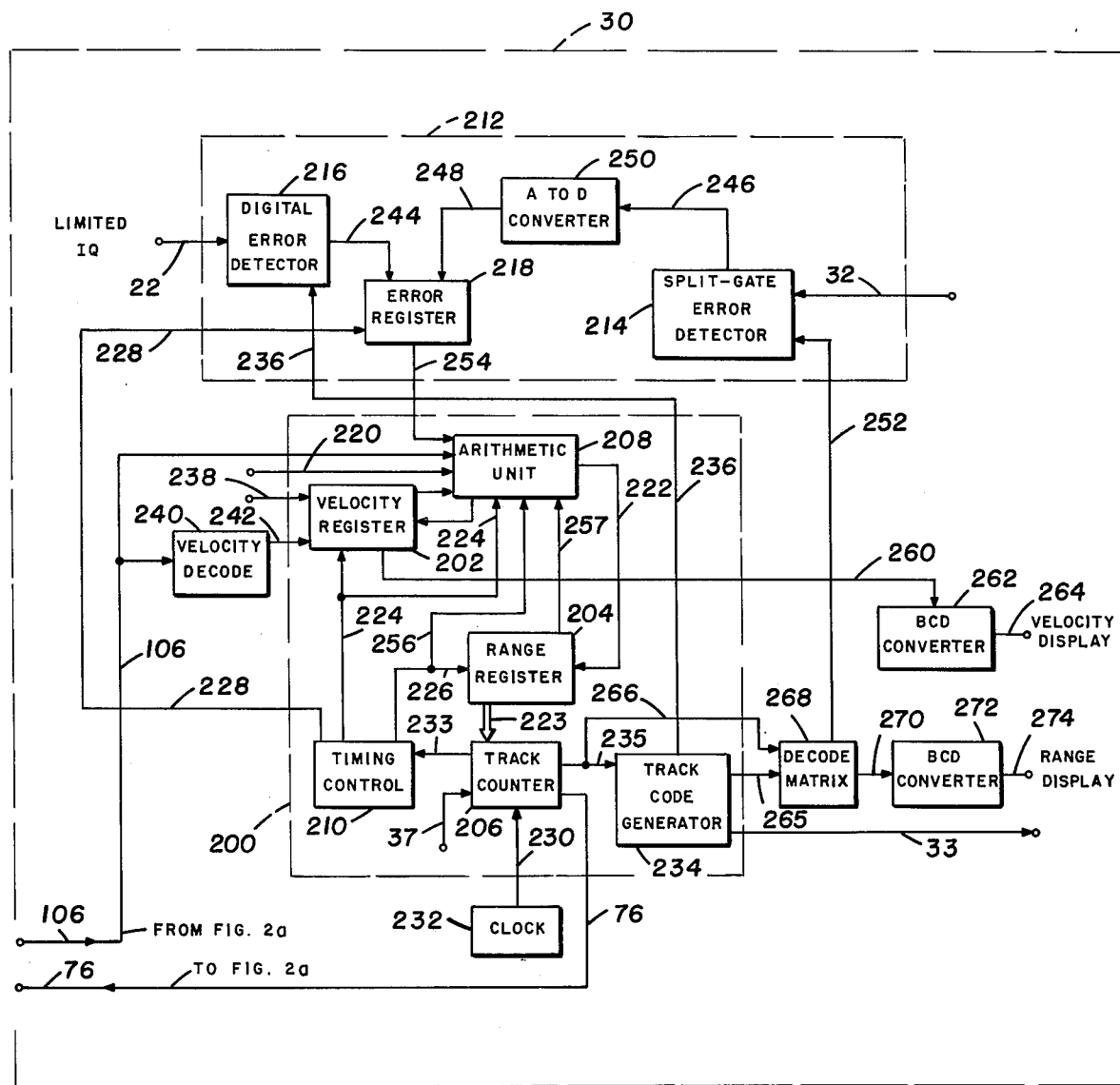
FIG. 2b TRACK PROCESSOR

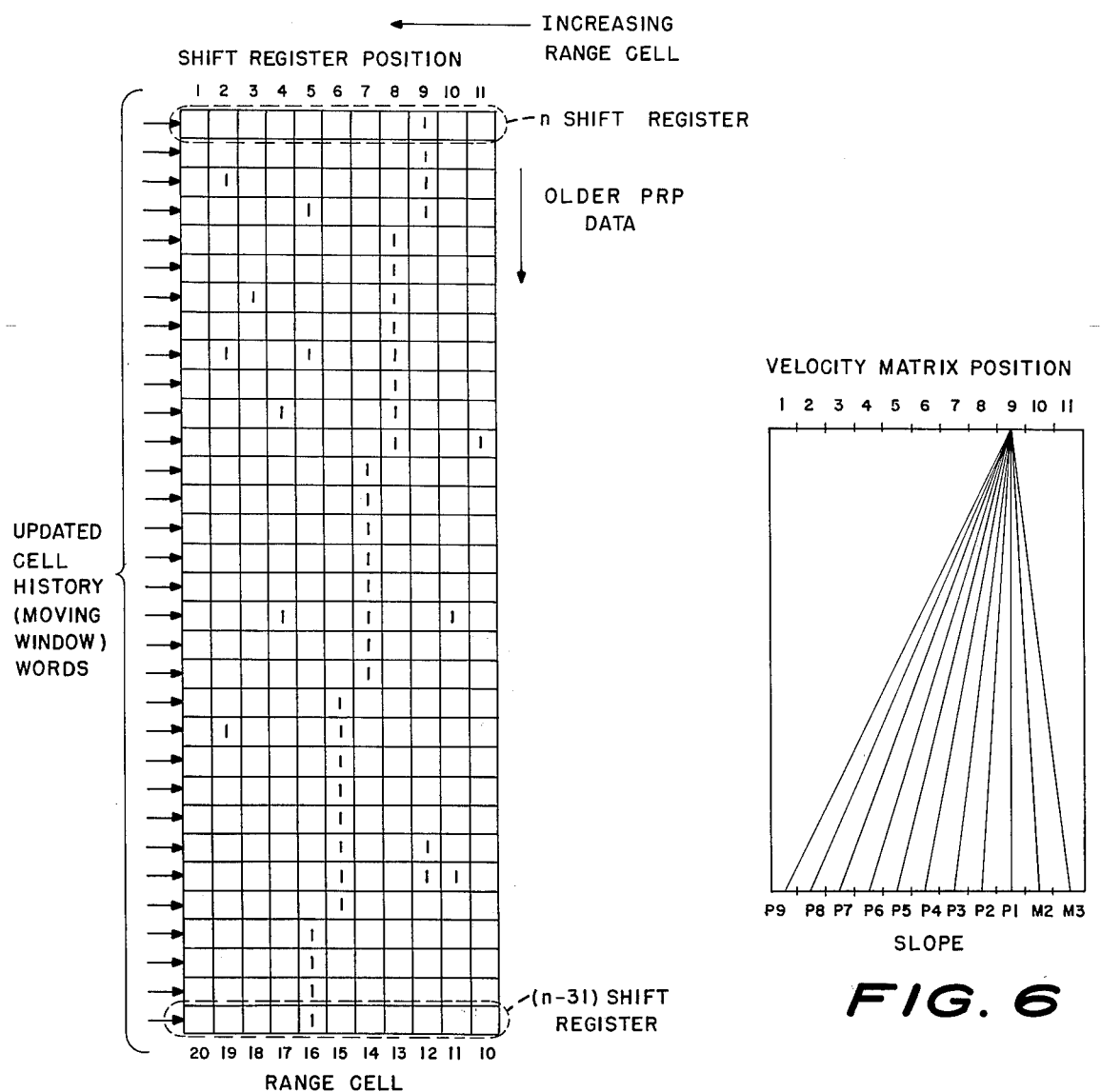
FIG. 5
FIG. 6
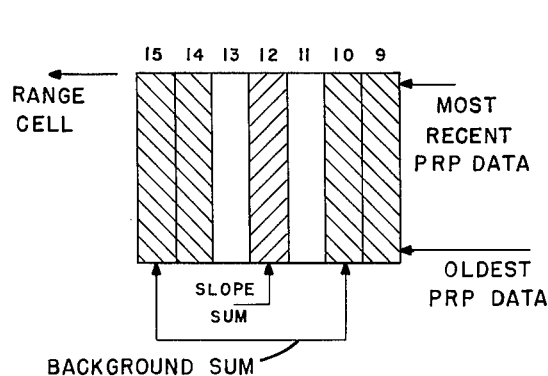
FIG. 7a
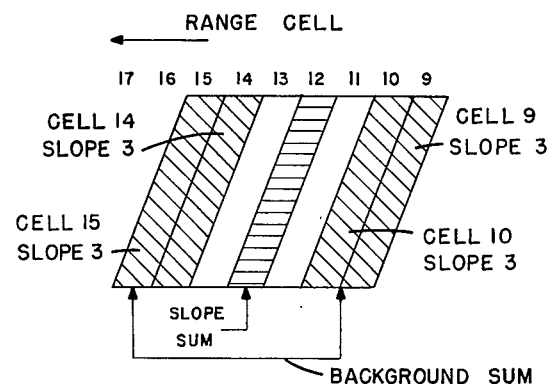
FIG. 7b

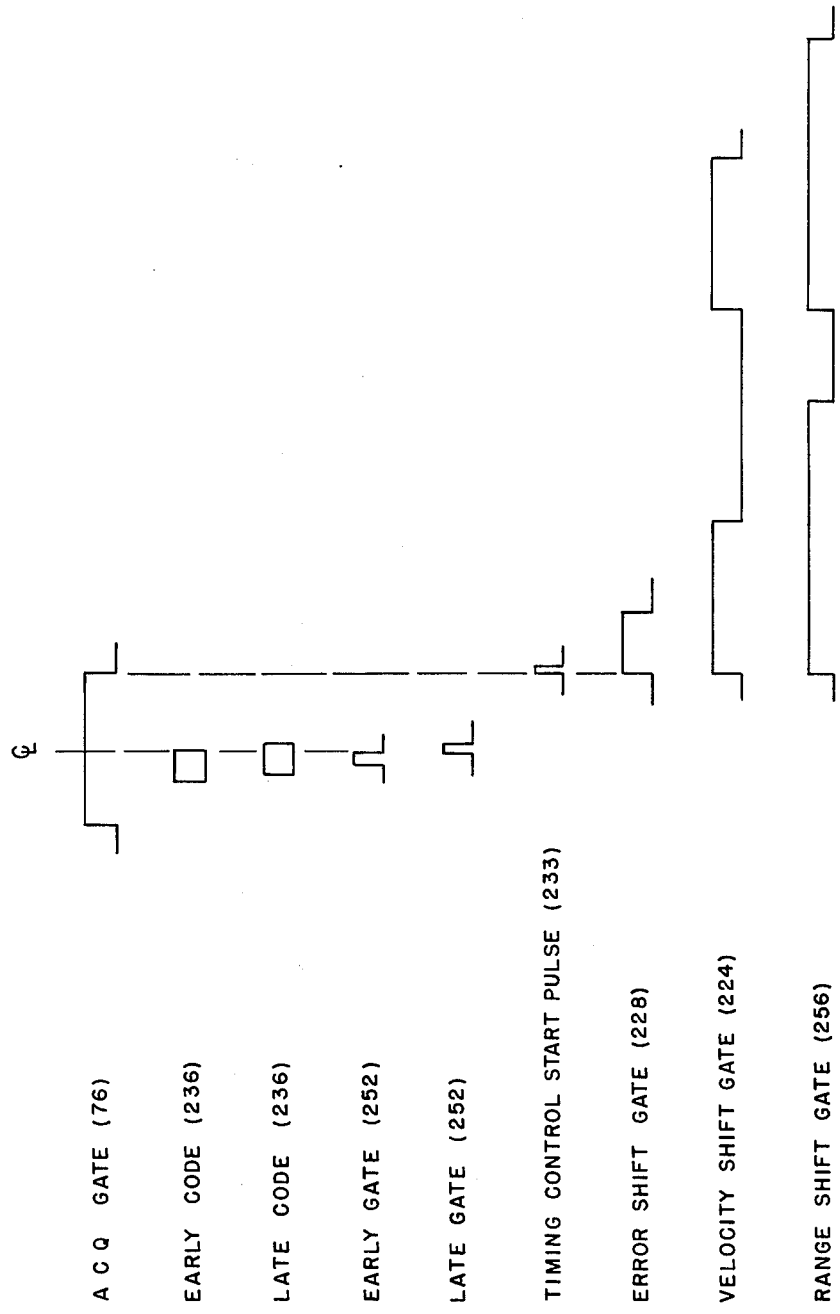

DIGITAL RADAR SIGNAL PROCESSOR

Cross-Reference to Other Applications

The present application is a continuation in part which discloses and claims subject matter disclosed in an earlier filed and commonly assigned now abandoned application by the same inventors, such application having Ser. No. 487,513 and having been filed July 11, 1974.

BACKGROUND OF THE INVENTION

The subject invention relates to a radar signal processor which incorporates digital techniques, and in particular to a digital signal processor which automatically acquires and tracks high-resolution, high velocity, multi-hit radar target returns in the presence of clutter.

The field of radar signal processing has undergone many changes since the early beginnings of radar. These changes have been due primarily to the introduction of digital computers and the digital techniques involved therein. Various digital computer signal processing techniques have been developed in the past in an attempt to reduce the deleterious effects of clutter on radar return signals, as well as to perform position and velocity measurements of acquired targets. Although such digital techniques have improved the effectiveness of radar signal processing, there are still many areas in the radar field which could benefit from the development of digital implementation. Automatic target acquisition and digital range tracking are both areas which could benefit from the further development of modern signal processing techniques.

More particularly, digital/analog hybrid and electromechanical range tracking systems have been widely employed in past radar systems. However, an all digital system has certain advantages over these two types of range trackers. One such advantage is the ease with which the initial range and velocity conditions may be inserted prior to closed-loop tracking. Also, slewing over the entire range interval may be accomplished in one pulse repetition frequency period (PRP) and does not involve moving gear trains as does an electromechanical system, nor does it require charging integrator capacitors as in a hybrid system. This inertialess character of an all digital system is of particular importance when high resolution, high velocity target conditions are involved.

While closed loop tracking has been successfully performed by these prior systems, the all digital system has even further advantages. One such advantage is the ability to perform excellent open-loop coasting, since all-digital systems (of the type taught by the present invention) store a velocity work in a shift register which remains unchanged over time and yields a perfect velocity memory. On the other hand, electromechanical systems possess friction and other losses which cause imperfect velocity memory. Similarly, analog systems store velocity data in the form of charges on integrating capacitors which also exhibit imperfect velocity memory due to spurious leakage paths.

SUMMARY OF THE INVENTION

The present invention acts to set a first threshold to reject clutter, noise and false alarm signals caused by clouds, weather, etc. This is accomplished by the use of a digital constant false alarm rate unit which counts the number of clocked noise pulses that occur within a noise gate generated during the radar dead time. The number of clocked noise pulses that occur within said noise gate is compared to the expected false alarm number which has been preset by the radar operator. If the counted number exceeds the expected number, the threshold is moved up; if it is less, the threshold is moved down.

If the signal being acquired exceeds the first threshold a "one" is clocked into two buffer shift registers; if it does not exceed it a "zero" is sent to the shift registers. Two buffer shift registers are used, so that when one is receiving input data the contents of the other one may be shifted into an "n-word" storage section in a memory. Synchronization and timing are achieved by a processor timing control and an address register. The maximum time required to transfer a data point into the memory has been found to be approximately 1.4 microseconds.

After the last live-time "n-word" has been transferred into the memory, the memory data processing cycle is initiated. Address registers control "writing in" and "outputting" of all information. A moving window word register is used to store and update the acquisition (n-word) data. A "moving window word" contains the last 32 pulse hit data history for a particular range cell. In order to update a "moving window word" it is shifted to a "moving window word" register. The "moving window words" are shifted around this loop until all the bits (sixteen) of the "n-word" have been used up and all sixteen moving window words have been updated. When this occurs the next "n-word" is written into the buffer register and the next "moving window word" (the seventeenth) is transferred into the moving window word register. This process continues until all the moving window range cell words have been processed.

The second threshold setting occurs in a slope processor which is comprised of a sum matrix, a parallel adder, a threshold decoder and a comparator. The second threshold is set by establishing a background sum in a threshold loop. The existence of a target in a particular range cell is determined by comparing its hit count along a given slope, i.e., the slope sum, with the hit counts of two range cells following it and two preceding it (i.e., the background sum). This second threshold setting will effectively discriminate against clutter and will allow target detection in the presence of clutter (if the target is larger than the clutter).

The sum matrix consists of shift registers which serve to input the data. The total accumulation for the four background range cells (two before and two after the range cell at issue) is added in the parallel adder with the sum being decoded to establish a variable "m-number". The range cell slope sum is then compared to the variable "m-number" and if higher, a target is declared. When a target is detected, its location and estimated velocity data are transferred to an allow logic unit which suppresses certain target declarations according to a fixed priority scheme, such as inbound and highest velocity targets first, before they enter the track processor.

A track signal processor (of the track processor) range tracks the receiver's video signals, and also accepts range and velocity designate information. "Designate Velocity" and "Designate Range" are external inputs which may be utilized by the processor, if available, to control the position and velocity of the acquisition gate. These input signals may be obtained from remote sensors tied together through a digital data transmission network. The track signal processor controls the position of the range acquisition gate and also provides range and velocity information in digital format.

The digital designate range word is fed into an arithmetic unit, corrected if necessary by a zero range corrector, then fed into a range register. A split-gate error detector is utilized, with its output being converted to a digital signal, then transferred to an error register. The error word and error signal are utilized as in a typical track loop and are added/subtracted to the range word and likewise added/subtracted to the velocity word.

The velocity and range register words are sampled periodically and converted to BCD form and used for console decimal displays.

It is therefore an object of the present invention to provide a radar signal processor utilizing digital circuits to provide dual adaptive thresholds for clutter rejection.

It is another object of the present invention to provide a radar signal processor having a first clutter rejection threshold set by a constant false alarm probability and a second clutter rejection threshold set by a background averaging technique.

It is still another object of the present invention to provide a radar signal processor employing digital circuits which will identify target range and velocity by use of a velocity range matrix constructed in a memory unit.

BRIEF DESCRIPTION OF THE DRAWINGS

FIGS. 2a and 2b, when placed side by side, with FIG. 2a on the left, constitute a block diagram showing the preferred embodiment in more detail.

FIG. 3 shows logic circuitry embodying the address input matrix included in FIG. 2a.

FIG. 4 shows logic circuitry embodying the output word matrix included in FIG. 2a.

FIG. 5 shows the possible target positions of a velocity store matrix.

FIG. 6 shows the possible slope patterns detectable off a single tap position on the n shift register of the velocity store matrix of FIG. 5.

FIGS. 7a and 7b show a portion of the velocity store matrix in which slope sums and background sums are taken. FIG. 7a shows a slope representing a stationary target; FIG. 7b shows a slope for a target moving in from a distant range cell to the range cell at issue.

FIG. 8 represents a timing diagram showing the signals generated on the lines emanating from the timing control and track counter elements.

DESCRIPTION OF THE PREFERRED EMBODIMENT

Figure 1:
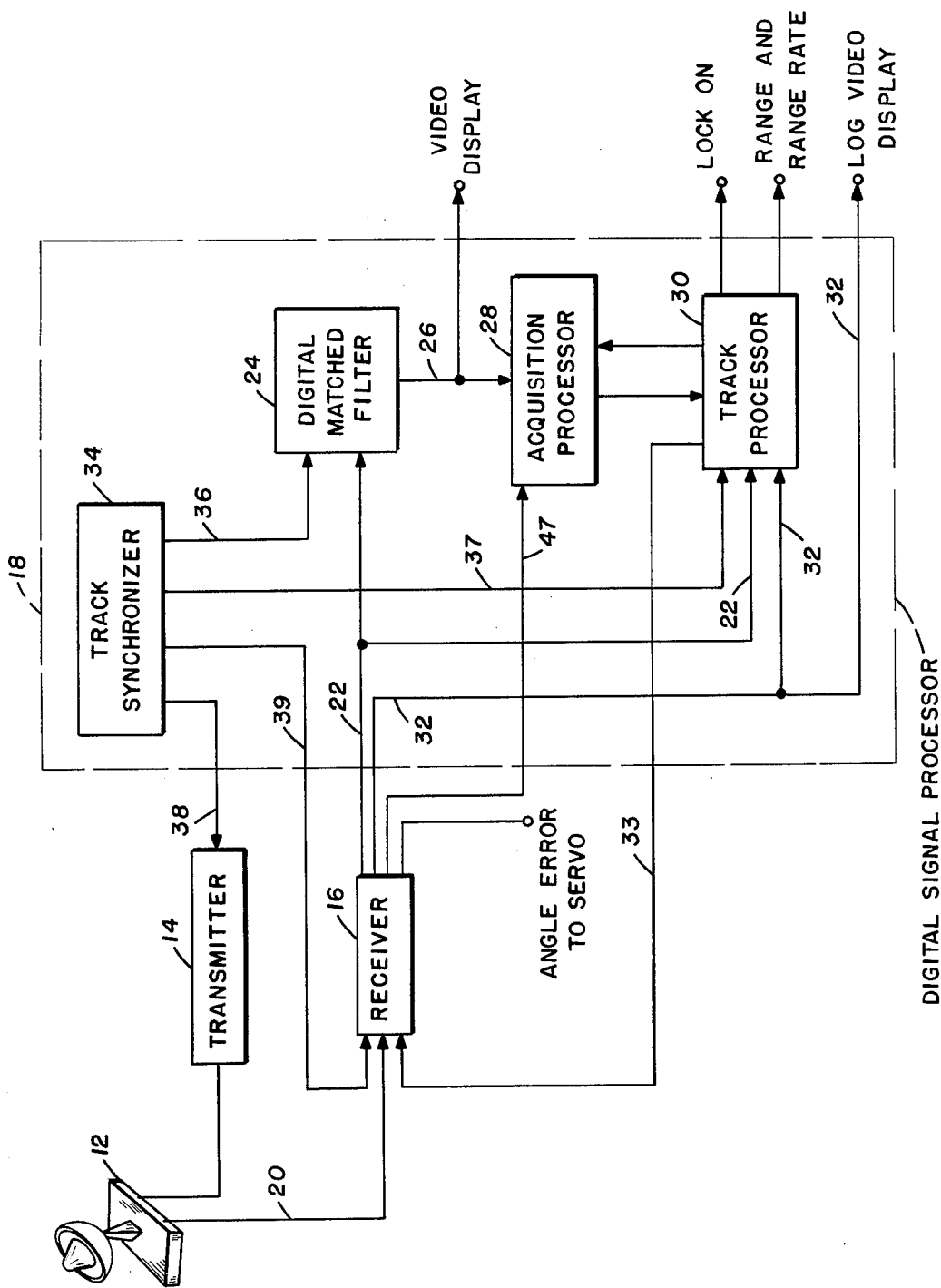
FIG. 1 is a block diagram representation of the major sub-units of the preferred embodiment of the invention.

Referring to FIG. 1, a functional block diagram of the invention is shown. A conventional radar antenna and multiplexer or rat-race switch 12 act to both receive and transmit radar signals. A transmitter 14 and receiver 16 are connected to the digital signal processor 18 of the present invention. A signal is sensed by the antenna unit 12 and fed to the receiver 16 on line 20. The received signal is then fed by line 22 to a digital matched-filter 24 where it is processed through and then fed on line 26 to an acquisition processor 28. A track processor 30 also receives input signals from the receiver 16 via two lines 22 and 32. The track processor 30 extracts error information from the signals on these two lines and uses such information to close the track loops. The track processor 30 also regenerates the code at the track point and feeds it to the receiver 16 on line 33. A track synchronizer 34 supplies signals so that the digital signal processor 18 can operate with the transmitter 14 and receiver 16. More specifically, the track synchronizer 34 produces: a digital matched filter code signal which is fed to the digital matched filter 24 on line 36; a reference signal fed to the track processor 30 on line 37; a transmitter code and gate signal which is fed to the transmitter 14 on line 38; and an angle reference code signal fed to the receiver 16 on line 39.

The digital signal processor of FIG. 1 is shown in more detail in FIGS. 2a and 2b. Referring to FIG. 2a, the acquisition signal processor, 28 of FIG. 1, uses a double threshold detection process to detect the target within the range acquisition interval defined by the radar operating mode and the designated range position. The first threshold set, shown generally at 40, utilizes automatically adjustable constant false alarm threshold detection; the second threshold set uses a background averaging technique. The first threshold set 40 has a first threshold detector 42 which acts as the element under control and receives the video signal on line 26. A noise gate generator 46, a false alarm counter 48, an expected threshold count 49, an interval counter 51, a comparator 52 and a threshold register 54 act as a digital constant false alarm rate unit. In order to establish a threshold unit which updates itself, a closed loop is established comprising the elements: first threshold detector 42, false alarm counter 48, comparator 52, threshold register 54, and a Digital/Analog converter 56 which feeds back into the first threshold detector 42. Control and sample functions are provided by noise gate generator 46, expected threshold count 49, and interval counter 51. In operation, the loop establishes a threshold level as follows. An analog noise signal on line 26 from receiver 16 enters first threshold detector 42 which senses the amplitude of the noise signal to determine when it is above a level set by the detector 42. The signal in detector 42 is converted into pulses from the continuous analog form by clock 80 which permits the noise signal to be fed into first threshold detector 42 only when the clock generates pulses. The output from detector 42 thus takes the form of clocked noise pulses on line 45. The false alarm counter 48 counts the number of clocked noise pulses on line 45 which occur within a noise gate generated by the noise gate generator 46 during the radar dead time (determined via connection line 47 from receiver 16). This number of noise pulses is summed over a number of pulse repetition periods (during radar dead time) in the false alarm counter 48 and compared to an expected false alarm number which is fed from expected threshold count unit 49 at the end of a preset time determined by interval counter 51. If the output of the false alarm counter 48 exceeds or is less than the expected false alarm number, a signal is produced by the comparator 52 and the threshold register 54 is counted up or down accordingly. The output of the threshold register 54 is fed to a digital to analog converter 56 which produces the required analog feedback signal on line 44 to adjust the first threshold detector 42. In essence, the first threshold level is determined by counting the actual false alarms, i.e., the noise pulses which exceed the level during the aforementioned preset time, comparing the actual false alarms with the expected number of false alarms, and then adjusting the threshold level up if there are more actual false alarms than expected false alarms or down if there are more expected than actual false alarms.

The output signal on line 45 from the threshold detector 42 is fed into live-time n-word buffer shift registers 58 and 60. A "one" is fed into the shift registers 58 and 60 if the acquisition video input, on line 26, is above the first threshold level (as set by the threshold detector 42) and a "zero" is clocked in if it is below such level. The routing of the live-time data into the n-word buffer shift registers 58 and 60 is controlled by signals on line 62 from a processor timing control 68.

Figure 3:
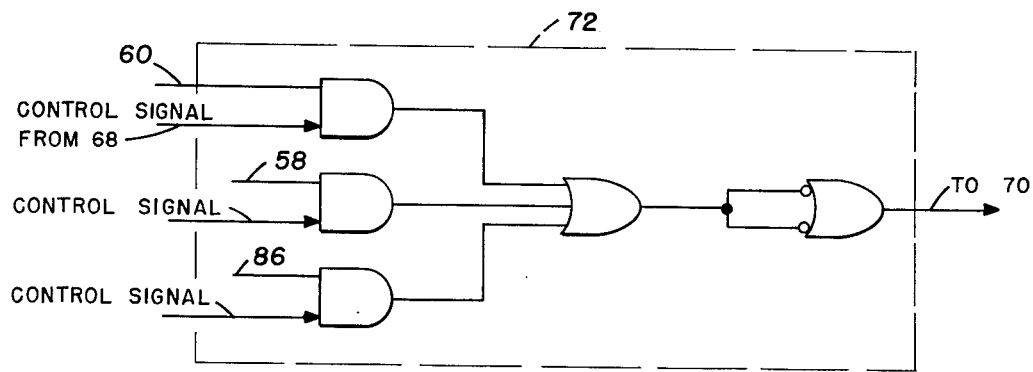

Processor timing control 68 controls both the input cycle and processing cycle of data from appropriate addresses indexed by address register 64 in response to signals on line 66 from processor timing control 68. During the input cycle, the processor timing control 68 controls the buffer registers 58 and 60 to operate in alternation. That is, every sixteen clock times from a clock 80, the processor timing control 68 selectively turns on either buffer register 58 or 60 while turning off the other to data being transmitted along lines 45. Buffer registers 58 and 60 are identical live-time n-word conventional shift registers which share the duty of holding live-time data until it is stored in memory 70 (via input word matrix 72). By way of example, processor timing control 68 first turns on buffer register 58. Sixteen bits of data are permitted to enter buffer register 58. At the same time, processor timing control 68 has turned off buffer register 60, allowing buffer register 60 to "dump" its contents into the input word matrix 72 and then into memory 70 at the address contained in address register 64. As seen in FIG. 3, input word matrix 72 is logic circuitry which channels incoming data into selected blocks of memory 70 at times determined by processor timing control 68. Data from buffer registers 58 and 60 and from a moving window word 86 (discussed later) are selectively delivered into memory 70 by ANDing the data with respective control signals from processor timing control 68 (on line 74 in FIG. 2a) and the output is then ORed to pass the data into memory 70. After sixteen clock times (the time it takes the sixteen bits to fill or "dump" from either buffer register, processor timing control 68, via lines 62, turns on the other buffer register, in this instance 60, to receive data on line 45 and turns off buffer register 58 (in this instance) allowing it to "dump" into the input word matrix 72 via its corresponding data flow path. Processor timing control 68 performs this alternation between buffer registers 58 and 60, by means of signals transmitted on lines 62, every 16 clock times. The clock counting of the processor timing control 68 is initiated by a signal on line 76 which comes from the track processor 30 (of FIG. 2b) and acts as an acquisition processor start trigger as later discussed).

The data transferred into and out of memory 70 comprises n-words and moving window words. As the live-time n-words are directed into memory 70 by alternately activating buffer shift registers 58 and 60, processor timing control 68 signals address register 64 on line 66 to increment and provide an address to memory 70. Addresses stored in the address register 64 are composed of two related, interdependent addresses: an n-word address and a moving window word address (shown below). The moving window word address is contained in the least significant string of ten bits in the address register 64. The n-word address is contained in the most significant ten-bit string of the fourteen-bit address register 64. The two addresses are compiled in the following manner.

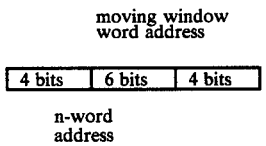

moving window word address

| 4 bits | 6 bits | 4 bits | n-word address

It is clear from the structure of the described address register 64 that the n-word address increments by one when the moving window word address advances by sixteen. In this way, the address register 64 is able to control the addressing of both n-word and moving window word (in a coordinated manner). Address input matrix 81, by means of conventional AND-OR logic circuitry similar to that in FIG. 3, receives the contents from address register 64 and separates out the n-word address from the moving window word address, addressing the data related to n-words and moving window words into two separate blocks of memory 70 via multichannel line 82.

N-words (or new words) are sixteen bit words which contain a yes/no decision indicating whether the threshold state of each of sixteen sampled range cells has been exceeded. Where the video return from a particular range cell exceeds the threshold, its corresponding bit in the n-word will be a yes (or 1) conveyed to buffer registers 58 and 60. Moving window words are thirty-two bit words which record the history of yes/no decisions (i.e., the previous thirty-two decisions) for each individual range cell. The n-words thus provide a present record of detected targets for a number of range cells while the moving window word provides a past record of detected targets for a single range cell.

Figure 4:
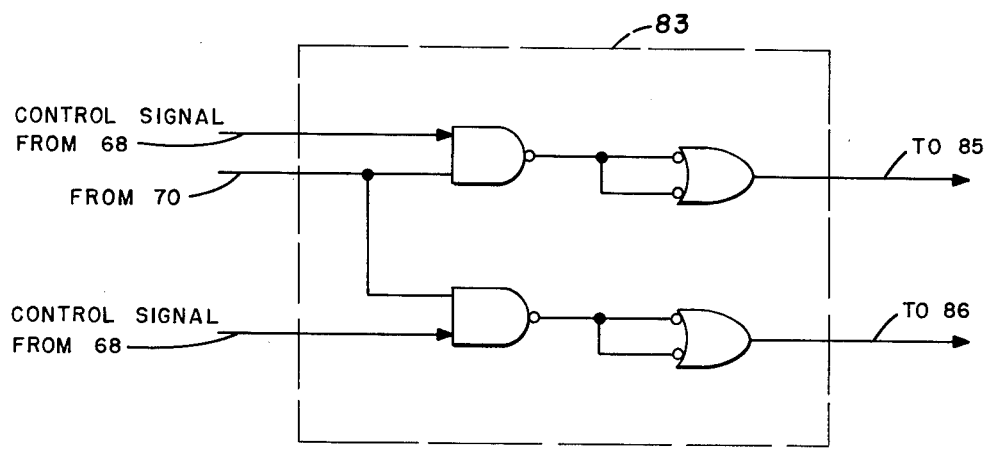

The processing cycle begins by outputting the first n-word written into the memory 70 and the first moving window words to be processed. An output word matrix 83 (illustrated in FIG. 4) is used to transfer data from the memory 70, with the transfer of n-word data being initiated by a signal on line 84 from the processor timing control 68. An n-word register 85 and a moving window word register 86 accept data words from the output word matrix 83. These two registers 85 and 86 act together to update the moving window word of each range cell and send on the updated moving window word to a velocity store matrix unit 88 for further processing. In order to update the moving window word with live-time data obtained from the last data-carrying pulse, an n-word contained in the n-word register 85 is shifted once into the moving window word register 86. The word in the moving window register 86 is then written back into its memory location via input word matrix 72, and the output word address in address register 64 is advanced by one. The next moving window word is then addressed, and using the same n-word, the next range cell, i.e., bit, of the n-word is used to update this second moving window word. The shifting and updating process continues until all sixteen moving window words are updated. When this has been accomplished the next n-word is written into the n-word register 85 and the seventeenth moving window word is transferred by the output word matrix 83 into the moving window word register 86. This operation then continues until all the moving window range cells words, from 0 to 624 in the preferred embodiment, have been processed. As noted previously, as each moving window word is updated it is shifted into the velocity store matrix 88; the configuration which will be discussed in more detail later.

The above-discussed processing cycle is now examined in step-wise fashion with accompanying visual representations. The steps performed in response to signals generated by processor timing control 68 follow. (1) An n-word is called from memory 70 and deposited in n-word register 85. This is accomplished by opening output word matrix 83 to receive a word from memory 70 in response to a signal transmitted by processor timing control 68 along line 84. Output word matrix 83, as previously discussed, is wired to send the appropriate information in memory 70 (in this instance as n-word) into the appropriate receiving register (in this instance, the n-word register 85) when signalled to do so by the processor timing control unit 68. Output word matrix 83 acts in the conventional matrix circuit fashion as a type of data channelling element. (2) A moving window word representing the history of the first range cell is called from memory 70 to be stored in moving window word register 86, again via output word matrix 83. (3) The value of the bit in the n-word is now made part of the thirty-two bit history, with the oldest bit of the previous history being discarded. (See visual representation below). In this way, the history is updated for each range cell every cycle. (4) The updated moving window word is re-entered into the memory 70 via input word matrix 72 and simultaneously stored in the velocity store matrix 88. Input word matrix 72 is wired to receive inputs of information from three sources: buffer register 58, buffer register 60, and moving window word register 86. The information from the buffer registers 58 and 60 is directed by the input word matrix 72 into a block of memory 70 reserved for n-words. Data from the moving window word register 86 is re-entered by input word matrix 72 into a part of memory 70 reserved for moving window words.

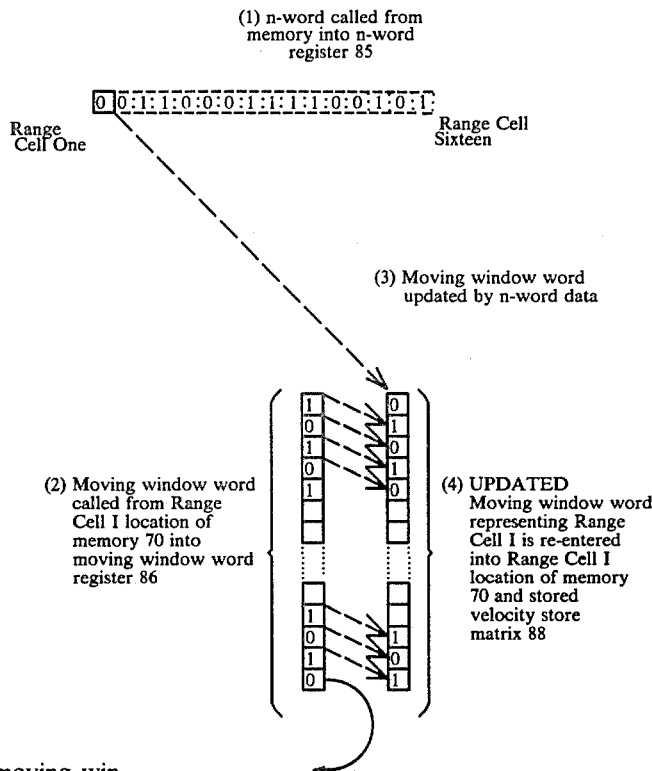

(5) The next moving window word corresponding to the next range cell (i.e., the next bit in the n-word) is then called from memory 70 and steps (2) – (4) are repeated under the control or processor timing control unit 68 until all sixteen range cells in the n-word have had their moving window word histories updated. (6) At this point, processor timing control unit 68 calls the next n-word from memory 70 and the corresponding moving window words are updated.

Updated moving window words, which consist of range cell histories extending from the n-31 to the n most recent pulse repetition frequency periods (PRP's), are sequentially shifted into velocity store matrix 88. Referring to FIG. 5, the velocity store matrix 88 of the preferred embodiment is shown as thirty-two 11-bit shift registers. Each vertical column represents a range cell history stored in a particular position in the thirty-two shift registers. Each horizontal row represents target data for a given PRP. As moving window words are sequentially shifted into the velocity store matrix 88 from moving window word register 86, the contents of the velocity store matrix 88 are shifted to the right.

Once filled with updated data, the contents of the velocity store matrix 88 can be used in determining the velocity of detected targets. Referring to FIG. 6, eleven slope patterns are illustrated emanating from the ninth shift register position at the most recent PRP time. A cursory examination indicates that slope pattern p1 signifies a stationary target which has not moved out of the range cell at issue (i.e., shift register position 9) for 32 PRP's. Having the lower shift register positions store data for higher range cell numbers (as shown in FIG. 5), slope pattern m3 signifies a slow-moving (Mach 1 in the preferred embodiment) outbound target which has entered only three range cells in 32 PRP's. Slope pattern p9, contrarily, signifies a fast-moving inbound target (Mach 5) which has traversed nine range cells in 32 PRP's. The determining of these slope indications is performed in slop processor unit 90. The slope processor unit 90 includes a slope sum unit 91, a background sum unit 93, a parallel adder 94, a threshold decoder 96, and a comparator 98. Slope sum unit 91 includes eleven slope summers (for each velocity slope) which scan the velocity store matrix 88 for targets. Each slope summer is wired to examine, for targets, those checkerboard matrix positions in the velocity store matrix 88 which are on a particular slope. FIG. 5 illustrates that each slope pattern has thirty-two selected checkerboard positions, extending over the most recent thirty-two PRP's, covering a different number of range cells and/or direction of target motion. Once a slope sum is generated by slope sum unit 91, background sum counts are generated by background sum unit 93 as shown in FIGS. 7a and 7b. Scanning along the same slope as a corresponding slope summer in slope sum unit 91, background summers detect the number of hits in nearby, predetermined range cells of similar slope. In the preferred embodiment there are four predetermined range cells which flank the range cell at issue, two range cells adjacent to each other, separated from the range cell at issue by a cell, on each side. That is, referring now to FIG. 7b, targets on slope 3 for range cells 9, 10, 14, and 15 provide background sums corresponding to the targets detected by the slope summer of slope 3 for range cell 12, the range cell at issue. Background sums for the predetermined range cells are added together in parallel adder 94 and are then entered into the threshold decorder 96 which generates an $m$ number which specifies the minimum required slope sum for target declaration. In the present embodiment, $m$ is varied between twelve and thirty-two. As each range cell enters the appropriate position of the $n$th shift register (shift register position 9 in the preferred embodiment), to become the range cell at issue, it has a value of $m$ calculated for each slope. Each slope sum, channelled along line 104, is delayed and later compared in comparator 98 with the corresponding $m$ value. If the $m$ value is exceeded, a target declaration signal enters a slope-allow logic unit 99 which inhibits certain slopes from declaring a target for later processing and creates an order of priority of target declaration when more than one slope of a single cell at issue exceeds its respective $m$ value.

Because each range cell, as its most recent PRP entry is shifted into the preselected shift register position (position 9 in this embodiment), is examined for all slope patterns and because slope allow logic unit 99 limits target declaration to, at most, one target per examined range cell, the radar video processor of the present invention is able to detect multiple targets while it tracks only one. To be sure, the present video processor can detect a different target for each examined slope for each range cell and could display them if desired. The slope allow logic unit 99, however, confines tracking to only one target, the target of highest priority. Target declarations screened by the slope allow logic unit 99 are passed to the track processor 30 along line 106.

The track processor 30 is shown in more detail in FIG. 2b, which is a continuation of FIG. 2a. The track signal processor shown generally at 200 utilizes a velocity register 202, a range register 204, a track counter 206, an arithmetic unit 208 and a timing control 210, to process the acquired target data. An error word generator shown generally at 212 employs a conventional split-gate error detector 214, a digital error detector 216 and an error register 218 to close the tracking loop.

The purpose of the tracking loop is to predict the next position of a target once acquired. The present tracking processor 30 accomplishes this purpose by performing three simple equations which essentially describe the operation and timing of the elements included therein. Performance of the first equation includes the taking of an error value $E_n$ generated by error detector unit 212, scaling the value $\alpha E_n$ where $\alpha$ is unity or less, and adding the scaled value $\alpha E_n$ to a previous range value $X_{p-1}$ either stored in the arithmetic unit 208 as the last predicted range value or supplied from an external designate range word source on line 220. An error adjusted range value $X_n = X_{p-1} + \alpha E_n$ is calculated by the arithmetic unit 208, the input and operation timing of which is controlled by timing control element 210. At the same or nearly the same time, timing control element 210 instructs the arithmetic unit 208 to read in and add a previous velocity value $V_{n-l}$ which is a value stored in the velocity register 202 from a previous velocity reading or from an external designate velocity word source in line 238, to the error value $E_n$ which is scaled in time to $(\beta/t)E_n$, where $t$ is the pulse repetition frequency period (PRP) interval. The value obtained by adding these two factors is $V_n = V_{n-l} + (\beta/t)E_n$, an equation representing the error adjusted velocity. Finally, to predict the new target range, the value $X_n$ is added in arithmetic unit 208 to $(V_n)$ $(t)$, after both values are generated, to give the third equation: $X_{predicted} = X_n + (V_n)(t)$. Timing control unit 210 is designed such that the proper factors from the proper registers and data sources are fed into the arithmetic unit 208 in the proper sequence to perform these three equations. For example, timing control 210 will trigger out a $V_{n-l}$ value from velocity register 202 or an $X_{p-l}$ value from range register 204 (these values being supplied in response to signals on lines 224 and 226, respectively) and add them with the respective scaled $E_n$ valve supplied via line 254 to the arithmetic unit 208 from error register 218 in response to a signal on line 228. When the values are added in the arithmetic unit 208 and $X_{predicted}$ is finally obtained, timing control 210 enters $X_{predicted}$ into range register 204 for further processing before display.

A more elaborate discussion relating to how the factors in equations one through three are processed and combined follows. Initial values for the equations are introduced from remote sources as designated range and velocity words. The designated velocity word provides an estimated value for velocity which may be shifted into velocity register 202 as an initial velocity value. This estimated value is used in the calculations performed in the arithmetic unit 208 as previously described. Because the estimated velocity is often unreliable, provision is made for setting the velocity registers 202 with zeroes. The designated velocity word, when accurate and reliable, effects smoother radar operation notwithstanding range data transitions during updating. The track processor 30, however, operates adequately with a zero or designated velocity word initially provided to velocity register 202. The designated range word, in similar fashion is utilized to determine the initial range in which the acquisition processor 28 is to look for targets. The designated range word is reformatted in the arithmetic unit 208 and is then loaded into the range register 204 as range data. In conventional alpha-beta loop fashion, the range data is updated and reloaded into the range register 204. From the range register 204 the updated range data is loaded into the track counter 206 via lines 223 on a command from timing control 210.

The track counter 206 receives input clock pulses on line 230 from clock 232 at 82 MHz. This is the rate at which the track counter 206 counts down it contents. The actual counting down does not commence until the track counter 206 is informed on line 37 from the track synchronizer 34 that the transmitter 14 is switched off. The track counter 206 counts down its contents over real radar time measured from transmitter 14 switch off time. That is, as the count goes down, the real radar time increases. Just before the count-down reaches zero, i.e., the point at which the updated range data says a target is present, an acquisition gate on line 76 pulses thereby turning on the processor timing control 68 (see FIG. 2a). During the acquisition gate (near its center) the track counter 206 enables a track code generator 234 on line 235. The track code generator 234 then generates track code signals to the angle channels of radar receiver 16 (see FIG. 1) on line 33 and also generates the early/late code signals to the digital error detector 216 on line 236. Coded signals from the track code generator 234 also enter the decode matrix 268 on line 265 where the code signals are reconverted into pulses. Near the acquisition gate center, the reconverted pulses are fed to the split-gate error detector 214 as early/late gates (see the timing diagram of FIG. 8). The reconverted pulses from the decode matrix 268 and early/late code signals from the track code generator 234 are fed to error word generator 212. Also, during the count in the track counter 206, other timing triggers (some of which enter enternal devices) are generated in response to signals carried on line 266 from the track counter 206 in the decode matrix 268. These trigger inputs to the decode matrix 268 include a range acquisition start trigger, receiver, and target detector range gates, and display scope triggers.

Error word generator 212, which produces $E_n$, operates in either of two modes: a noncompressed mode employing a split-gate error detector 214 and a compressed mode utilizing a digital error detector 216. The entire track loop, of which the error word generator 212 is a part, is a conventional alpha-beta tracking loop with adaptive bandwidth control. The noncompressed mode employs a conventional split-gate error detector well-known in the signal processing art. (See *Introduction to Radar Systems* by M. I. Sholnik, p. 190, 1962). The split-gate error detector 214 operates conventionally by receiving the acquisition video on line 32 and the early/late gates on line 252 from decode matrix 268 and by producing a D.C. error signal on line 246. The D.C. error signal enters an analog-to-digital (A.D) converter 250 which converts the signal to digital form on line 248. This error signal on line 248 is then fed to the error register 218. When the track counter 206 count corresponds to the end of the acquisition gate, a pulse is generated on line 233 to the timing control 210. An appropriate signal on line 228 from the timing control 210 to the error register 218 is then produced to shift the error word into the arithmetic unit 208 by way of line 254. At the same time, a signal on line 256 from the timing control 210 acts to shift the range word contained in the range register 204 into the arithmetic unit on line 257. These two words are added in the arithmetic unit 208 and the resultant word is shifted back into the range register 204 on line 222. In like manner, the error word $E_n$ is added in scaled form to the velocity word to produce the adjusted velocity word. The velocity word in velocity register 202 may come from the acquisition processor 18 (see FIG. 2a) on line 106. Because the velocity data on line 106 represents a code indicative of the slope velocity pattern detected, it must be reformatted before the arithmetic unit 208 can use the word as an input. Velocity decode matrix 240 decodes the velocity data into more useful form before passing the data as a velocity word into velocity register 202. The adjusted velocity word is combined with the range word to produce a predicted range value which is shifted into the range register 204 (as previously discussed). The range register 204 then contains a predicted range value which can be used for the next range prediction cycle.

Figure 9:
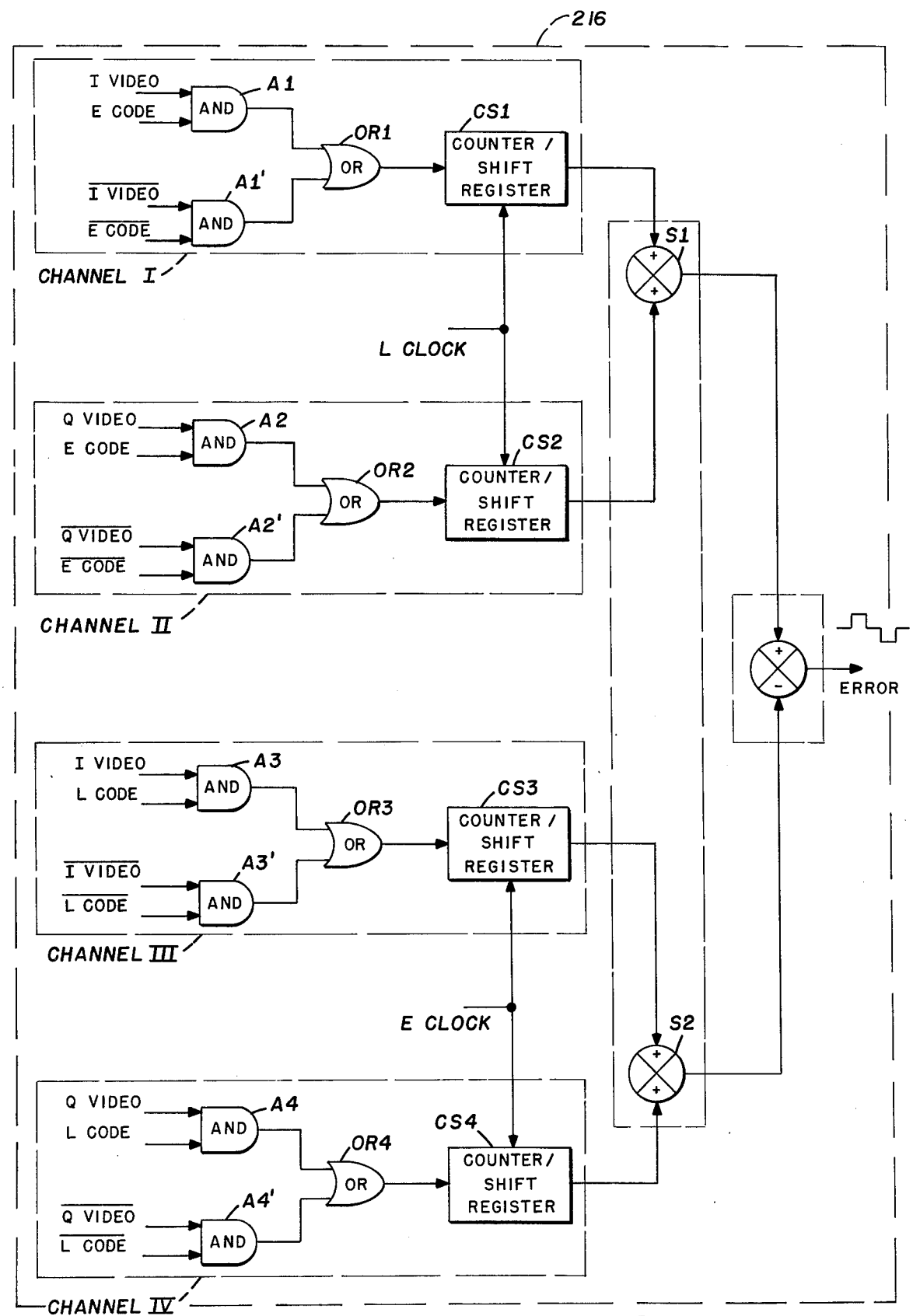
FIG. 9 represents the digital error detector circuitry of the preferred embodiment.
Figure 10:
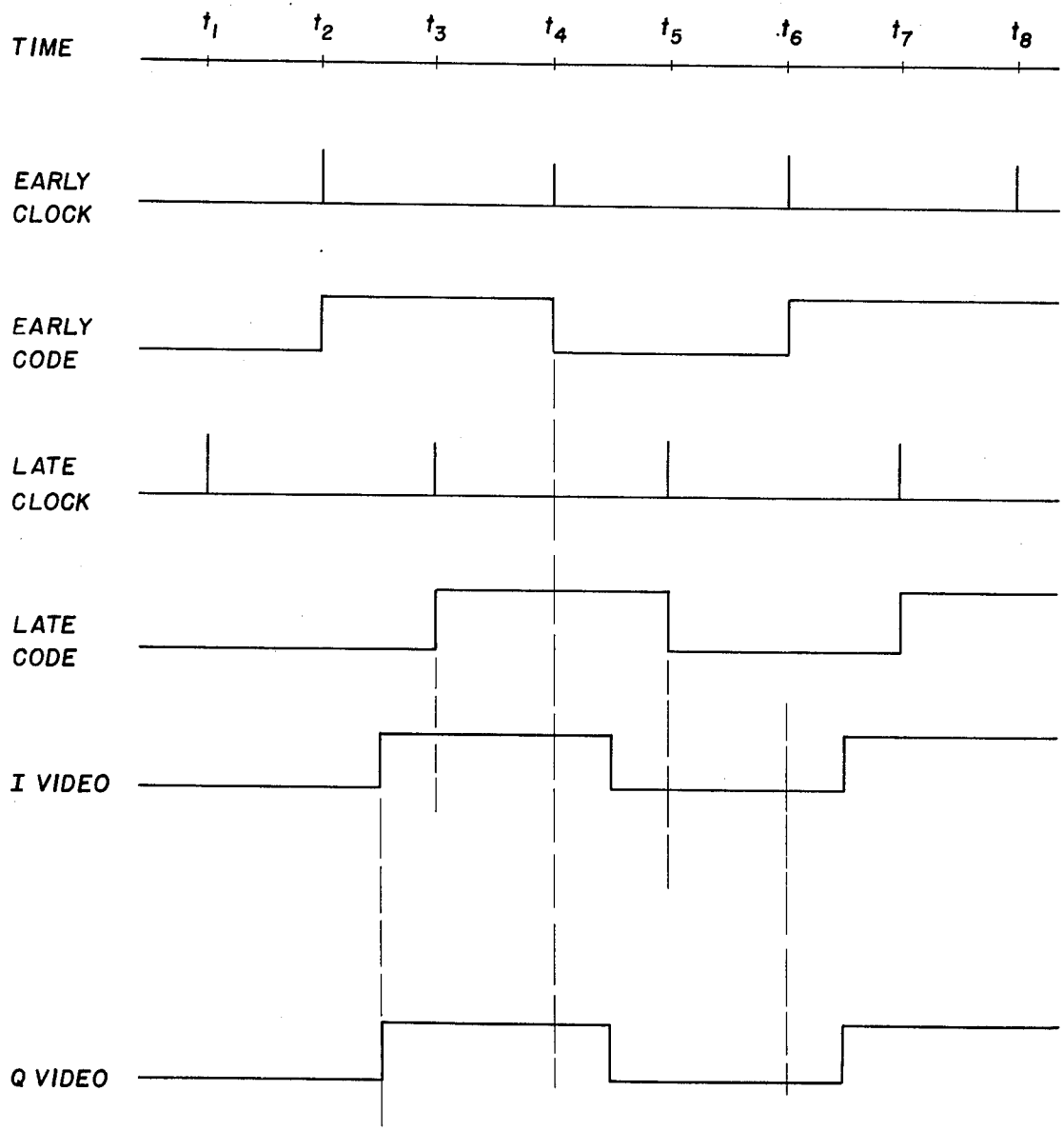
FIG. 10 shows a timing diagram of the digital error detector.

In the compressed code, the track loop includes a digital error detector 216 shown specifically in FIG. 9. The timing of the digital error decoder 216 is shown in FIG. 10. In FIG. 9, the video return is shown split into its in-phase (I) and quadrature (Q) components. As is customary, the I and Q video are employed to maximize the information obtained from the video radar return, without losing amplitude or phase information. Similar to the conventional split-gate detector 214, the digital error detector 216 employs an early/late gate code as described in the aforementioned Skolnik text. The essential difference between the split-gate detector 214 and the digital error detector 216 is that the digital error detector 216 examines the returned signal discretely rather than continuously. Instead of producing a difference analog signal measuring the energy present during each gate (as with the split-gate), the digital error detector 216 produces a number of "agreements" representing the error signal. As seen in FIG. 9, the digital error detector 216 is a four-channel element which determines when the I/Q video and early/late gating agree at set clock times. In channel one, the in-phase (I) video is ANDed in gate A1 with the early (E) code - the output being entered into counter/shift register CS1 when clocked by the late (L) clock. Thus, whenever the I video, E code, and L clock are in agreement, the counter/shift register CS1 increments. Similarly, the Q video and E code are ANDed in gate A2 of channel II and counted in counter/shift register CS2 when they agree during L clock pulses. I video and L code signals are checked for agreement during early (E) clock pulses in channel III by means of gate A3 and counter/shift register CS3. Finally, channel IV counts agreements between Q video and L code signals during E clock pulses in counter/shift register CS4. The sum of agreements in channels I and II accumulated by summer S1, reflect the number of agreements occurring during early gating while the sum in channels III and IV accumulated in summer S2, reflect the number of agreements during late gating. Subtracting the number of agreements in summer S2 from the number of agreements in summer S1 in a subtractor yields a digital error signal output carrying information similar to that of the digitized output of split-gate error detector 214. Ideally, without noise, the error signal of the digital error detector 216 would have a squared shape rather than the s-shape sawtooth of the split-gate error detector 214. With noise, however, the error signal from the digital error detector 216 is rounded off somewhat.

FIG. 9 also includes the ANDing in gates A1' through A4' of inverted video with inverted early/late code signals in synthesizing error signals alternatively with the uninverted signals via OR gates OR1 through OR4. Due to target motion, the I or Q video may occur 180° out of phase with the early/late codes. If the appropriate early or late code and video signal are in perfect agreement but out of phase, the count for that channel would be zero. A perfect inverted match as well as a perfect uninverted match of the inputs indicate the same degree of agreement. The count on each channel is thus centered on the (maximum count)/2 count value which represents the average agreement count due to noise alone with no target video present. By considering both inverted and uninverted inputs, agreements can be counted regardless of phase differences.

The timing of the logic shown in FIG. 9 is set forth in FIG. 10. 1's indicate points of agreement which are counted in the appropriate counter/shift register. A "1" for example, is detected in channel I when the L clock generates a pulse at times $t_3$ and $t_5$; the E code and I video agree and are counted in counter/shift register CS1. Also, channel III and channel IV at time $t_6$ both indicate a 1 where the inverted L code ANDed with the inverted I video and the inverted Q video, respectively, indicate agreements which are fed to counter/shift registers CSIII and CSIV, respectively. The digital error detector 216, by employing various codes (see *Modern Radar* by R. S. Berkowitz, pps. 274 et seq., 1965 for a discussion of pseudo-random binary codes), provides an effective way of extracting error signals from radar video signals.

The velocity and range register words are sampled periodically to provide decimal displays at the operator console. Referring again to FIG. 2b, the velocity word contained in the velocity register 202 is fed on line 260 to a binary coded decimal (BCD) converter 262 which produces the velocity word in decimal form on line 264. Similarly, the range word which was contained in the range register 204 and fed to the track counter 206 is fed on line 266 to a decode matrix unit 268. The range word is fed on line 270 to a second BCD converter 272 which reproduces the range word in decimal form on line 274 which is connected to the console decimal display.

Various other modifications, adaptations and alterations are of course possible in light of the above teachings. Therefore, it should be understood at this time that within the scope of the appended claims the invention may be practiced otherwise than as specifically described.

What is claimed is:

1. A digital signal processor for use with a radar receiver, comprising:
    an adaptive constant false alarm threshold loop connected to receive signal returns from said radar receiver for producing a signal indicative of a target,
    memory means connected to receive said signal indicative of a target for storing said signal and updating said signal in accordance with successive signals indicative of a target and producing a digital word indicative of said target,
    an adaptive background average threshold loop connected to receive said digital word indicative of said target for comparing said word with selected words which precede and follow said word in time and for producing an output signal declaring a target if said word exceeds said selected words,
    a track signal processor having a first input connected to a track loop signal and a second input connected to receive said output signal from said adaptive background average threshold loop for providing digital range and velocity signals, and
    an error word generator connected to receive said digital range and velocity signals from said track signal processor for producing an error word signal which is fed back to said first input of said track signal processor for closing a track signal loop.

2. The digital signal processor of claim 1 wherein said adaptive constant false alarm threshold loop comprises:
    a threshold detector having a first input connected to receive said radar signal returns and a second input connected to receive a feedback signal from said adaptive constant false alarm threshold loop for producing a pulsed output signal indicative of a target if said signal at said first input exceeds said signal at said second input,
    noise gate signal generator means connected to said radar receiver for producing a gate pulse output signal during a dead period of said radar receiver,
    a false alarm counter having a first input connected to receive said output signal from said threshold detector and a second input connected to said gate pulse output signal for counting a number of pulses of said first input which occur within said gate of said second input and producing an output signal proportional to said number, and
    preset comparator means having an input connected to receive said output signal from said false alarm counter producing said feedback signal connected to said threshold detector when said output signal from said false alarm counter exceeds a preselected number.

3. The digital signal processor of claim 2 wherein said memory means comprises:
    first and second selectively enabled buffer shift register means connected to receive said pulsed output signal from said threshold detector and each producing an output signal,
    input word matrix means connected to said first and second shift register means for selectively enabling said first and second buffer shift register means,
    a memory portion having a first input connected to selectively receive the output from said first shift register and the output from said second shift register and a second input, channelled through said input word matrix means, connected to receive an updated digital word from a feedback loop for producing a binary word output indicating a number of target returns, and
    third shift register means connected to receive said binary word output from said memory means for producing said digital word indicative of said target and for being fed back to said second input of said memory means.

4. The digital signal processor of claim 3 wherein said adaptive background average threshold loop comprises:
    a slope sum unit connected to receive said digital word from said memory means for producing a digital sum of target detections along a certain slope for a certain range cell of said digital word,
    a background sum unit connected to receive said digital word for producing a digital sum of target detections along said certain slope for each of a plurality of range cells proximate to said certain range cell of said digital word, a parallel adder for producing a summed output of the target detections associated with all of said proximate range cells, comparator means, having a first input connected to receive said summed output signal from said parallel adder and a second input connected to receive said digital sum from said slope sum unit, for producing a target-declared output signal when said slope sum output signal exceeds said background sum output signal, and slope allow logic means, connected to receive target-declared output signals from said comparator means, for disallowing the transmitting to said track signal processor of certain target-declared output signals according to a pre-established priority scheme.

5. The digital signal processor of claim 4 wherein said track signal processor comprises:

a first selectively enabled shift register connected to receive said output signal from said second threshold loop for producing an output signal representing a range word, a second selectively enabled shift register connected to receive said output signal from said second threshold loop for producing an output signal representing a velocity word, and an arithmetic unit having a first input connected to receive said signal representing a range word, a second input connected to receive said signal representing a velocity word, and a third input connected to receive said error word signal from said error word generator for adding or subtracting said third input to a corresponding one of said first and second inputs for producing an error adjusted range word output signal and an error adjusted velocity word output signal, respectively.

6. The digital signal processor of claim 5 wherein said error word generator comprises:

a split-gate error detector connected to receive said digital range and velocity signals from said track signal processor for producing an output error signal therefrom, an analog to digital converter connected to receive said output error signal from said split gate error detector for producing a converted output signal, and a shift register connected to receive said converted output signal for producing said error word signal.

7. A signal processor for use with a radar receiver receiving signals containing noise pulses, said signal processor, comprising:

constant false alarm rate averaging means connected to receive said radar signals from said receiver for counting said noise pulses occurring in a selected time period and producing an output n-word signal when said pulses exceed a selected number, memory means having a first input connected to receive said output n-word signals from said constant false alarm rate averaging means for storing and updating a selected number of said output n-word signals and producing an output signal when said selected number of n-word signals has been exceeded, slope summing means connected to receive said output signals from said memory means for producing a current slope summed output signal therefrom, background sum adder means connected to said slope summing means for combining prior and subsequent slope summed output signals and decoder means connected to said background sum adder means for generating a background sum-related threshold value, m, second threshold means having a first input connected to receive said current slope summed output signal from said slope summing means and a second input to receive said background sum-related threshold for producing an output m-word signal when said first input signal exceeds said second input signal, and tracking signal processing means connected to receive said output m-word signal from said second threshold means for correcting any errors contained in said output m-word signal.

8. The signal processor of claim 7 wherein said constant false alarm rate averaging means comprises, a false alarm counter connected to receive actual false alarm count signals emanating from said receiver, an expected count unit for periodically generating an expected false alarm count established by external means, comparator means having a first input connected to receive actual false alarm count signals emanating from said false alarm counter and a second input connected to receive the output from said expected count unit for producing a threshold update signal when said first input differs from said second input, and a threshold storage register means receiving the comparator means output as its input for changing and storing an updated threshold value.

9. The signal processor of claim 8 wherein said tracking signal processing means for correcting any errors comprises:

first and second shift register means each connected to receive said output m-word signal from said second threshold means for storing said output m-words and producing velocity and range output words, respectively, therefrom, split-gate error detector means connected to receive said output m-word signal for producing an error value from which velocity and range error output signals are derived, and arithmetic unit means having first input connected to receive said velocity output words from said first shift register means and a second input connected to receive said range output words from said second shift register and a third input connected to receive said velocity and range error output signals for adding said velocity error signals to said first input signals and said range error signals to said second input signals.

* * * * *